(12) United States Patent
Kao et al.

(10) Patent No.: US 8,774,061 B2
(45) Date of Patent: Jul. 8, 2014

(54) VOIP SERVER AND METHOD FOR MANAGING GEOGRAPHICAL INFORMATION

(75) Inventors: Ming-Chuan Kao, New Taipei (TW); Sen-Cai Yang, Shenzhen (CN); Shih-Hao Liu, New Taipei (TW); Jen-Hsiung Charng, New Taipei (TW)

(73) Assignees: GDS Software (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 59 days.

(21) Appl. No.: 13/483,058

(22) Filed: May 30, 2012

(65) Prior Publication Data

US 2013/0003721 A1    Jan. 3, 2013

(30) Foreign Application Priority Data

Jun. 30, 2011    (CN) .......................... 2011 1 0181824

(51) Int. Cl.
*H04W 4/02*        (2009.01)
*H04L 29/06*       (2006.01)

(52) U.S. Cl.
CPC *H04W 4/02* (2013.01); *H04L 65/40* (2013.01)

USPC ............................................ 370/270; 370/390

(58) Field of Classification Search
CPC ................................ H04W 4/02; H04L 65/40
USPC ........................................ 370/352, 270, 390
See application file for complete search history.

(56) References Cited

U.S. PATENT DOCUMENTS

2006/0178215 A1*   8/2006   Lehikoinen et al. ............ 463/39

* cited by examiner

*Primary Examiner* — Sai-Ming Chan
(74) *Attorney, Agent, or Firm* — Novak Druce Connolly Bove + Quigg LLP

(57) ABSTRACT

A method for managing geographical information of a plurality of Voice over Internet Protocol (VoIP) terminal devices using a VoIP server receives location information of the VoIP terminal devices from the VoIP terminal devices, stores geographical information of the VoIP terminal devices into a data sheet stored in a storage device of the VoIP server. The method detects a query from one of the VoIP terminal devices, retrieves the geographical information from the data sheet according to the query, and obtains an electronic map from the storage device. The method further populates the retrieved geographical information on the electronic map, and sends the electronic map to the VoIP terminal device corresponding to the location information.

12 Claims, 5 Drawing Sheets

VOIP SERVER AND METHOD FOR MANAGING GEOGRAPHICAL INFORMATION

BACKGROUND

1. Technical Field

Embodiments of the present disclosure relate to information managing technology, and particularly to a Voice over Internet Protocol (VoIP) server and method for managing geographical information.

2. Description of Related Art

Users of VoIP terminal devices such as computers, mobile phones and other mobile devices may obtain information from a VoIP server. However, the VoIP terminal device does not send its location information to the VoIP server. Therefore, the VoIP server cannot obtain location information and status information of other users of VoIP terminal devices and correlate them for the benefit of all users. It limits the range of the VoIP use.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
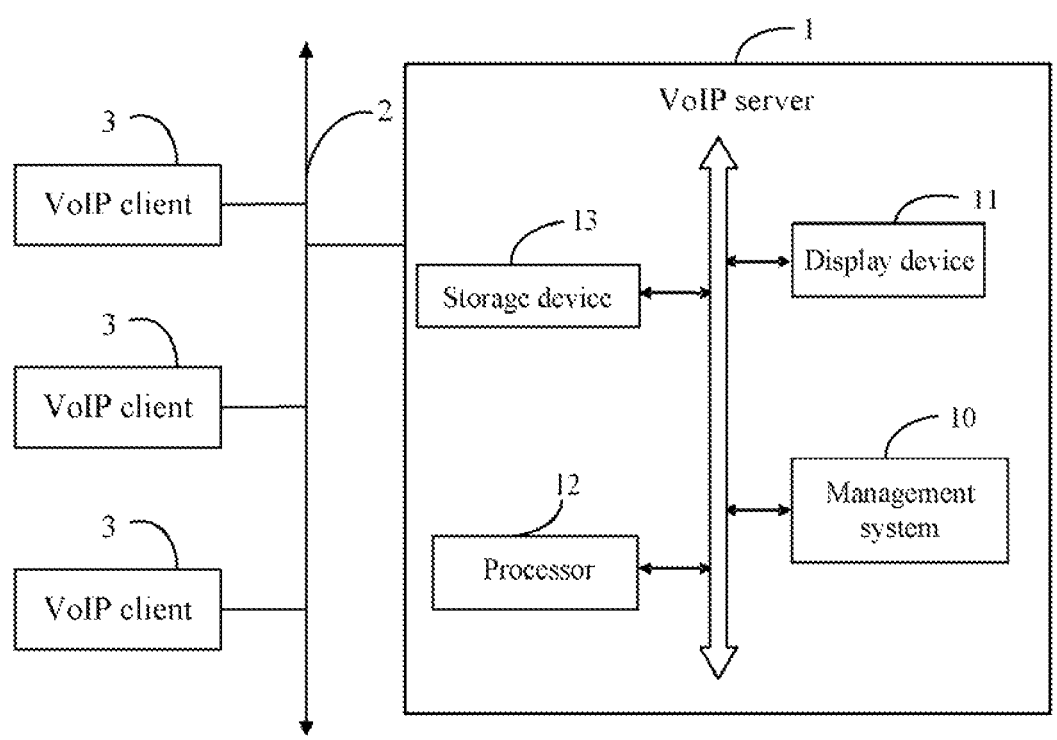
FIG. 1 is a schematic diagram of one embodiment of the VoIP server including a management system.

FIG. 1 is a schematic diagram of one embodiment of a VoIP server 1 including a management system 10. In the embodiment, the VoIP server 1 is electronically connected with a plurality of VoIP terminal devices 3 (only three are shown in FIG. 1) through a network 2. The network 2 may be the Internet, an intranet, or any other relevant network. The VoIP terminal device 3 may be a computer, a mobile phone, or other mobile device that has a VoIP function.

The VoIP server 1 further includes a display device 11, at least one processor 12 and a storage device 13. The VoIP server 1 may be a computer, a server, or any other computing device. In one embodiment, the VoIP server 1 provides a VoIP communication protocol to receive information sent by each of the VoIP terminal devices 3 as to their respective current locations (location information). The location information identifies location of the VoIP terminal device 3, and includes a latitude and a longitude.

In one embodiment, the storage device 13 stores a data sheet which contains a plurality of data rows. Each of data rows records user information of each user of the VoIP terminal device 3, login information ("login time") of each user of the VoIP terminal device 3, status information of each user of the VoIP terminal device 3 and the location information of the VoIP terminal device 3. The user information identifies the user of the VoIP terminal device 3, and may include a name, and an identifier (ID) of the user. The status information identifies the user's status, for example, online or offline. The data sheet may be in the form of a XML format file, or a XLS format file. The storage device 13 also stores an electronic map (e.g., a GOOGLE map) comprising different locations. The display device 11 displays the electronic map that is populated with the location information and the status information.

In one embodiment, the management system 10 may include computerized instructions in the form of one or more programs that are executed by the at least one processor 12 and stored in the storage device 13 (or memory). A detailed description of the management system 10 will be given in the following paragraphs.

Figure 2:
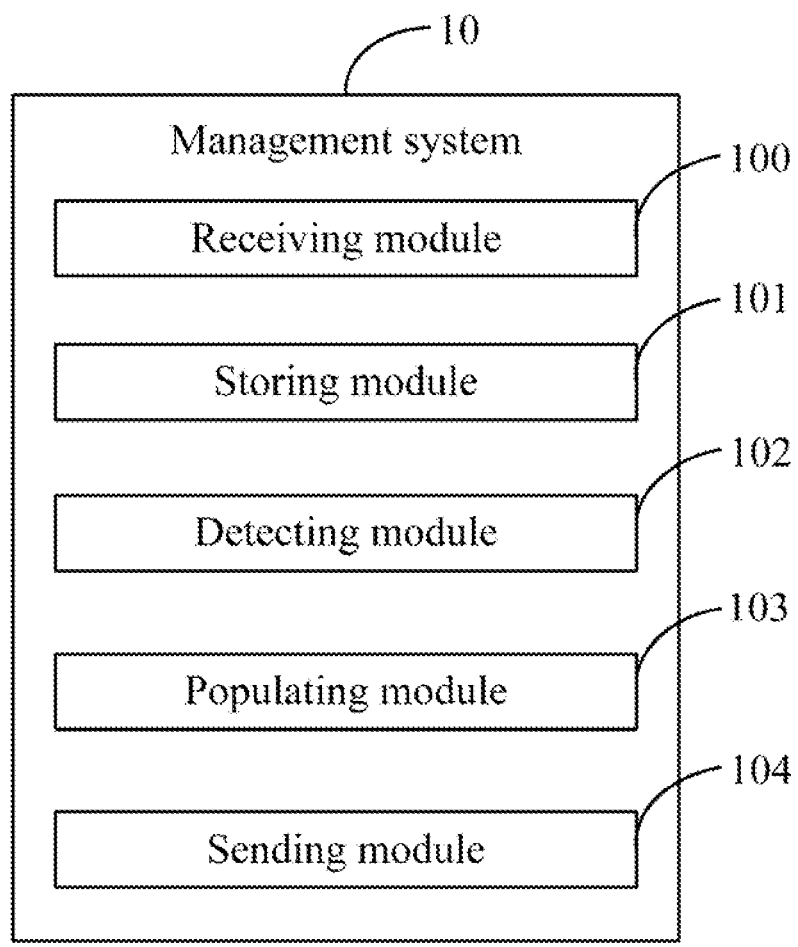
FIG. 2 is a schematic diagram of function modules of the management system included in the VoIP server.

FIG. 2 is a schematic diagram of function modules of the management system 10 included in the VoIP server 1. In one embodiment, the management system 10 may include one or more modules, for example, a receiving module 100, a storing module 101, a detecting module 102, a populating module 103, and a sending module 104. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
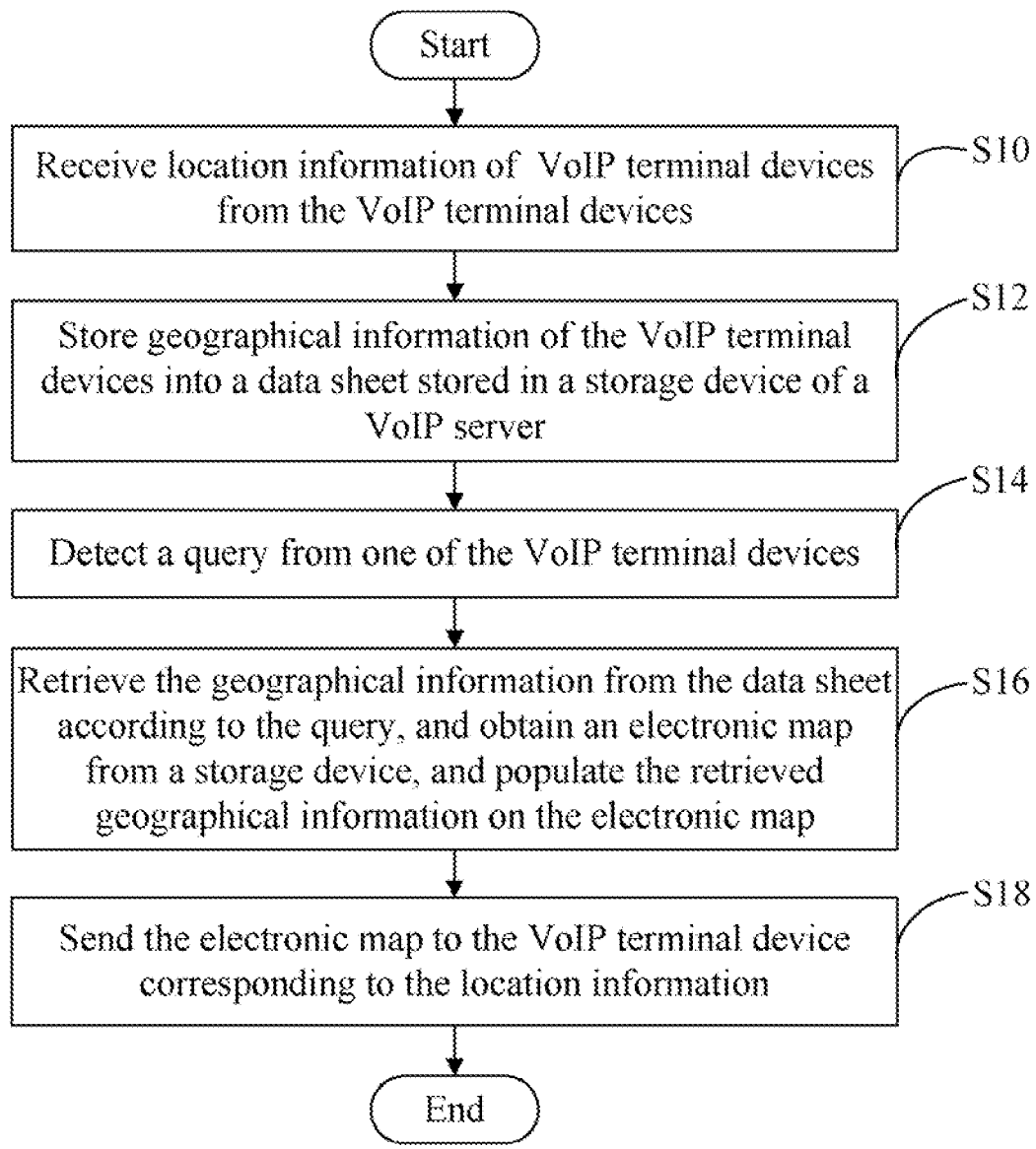
FIG. 3 is a flowchart of one embodiment of a method for managing geographical information of the VoIP terminal devices using the VoIP server.
Figure 4:
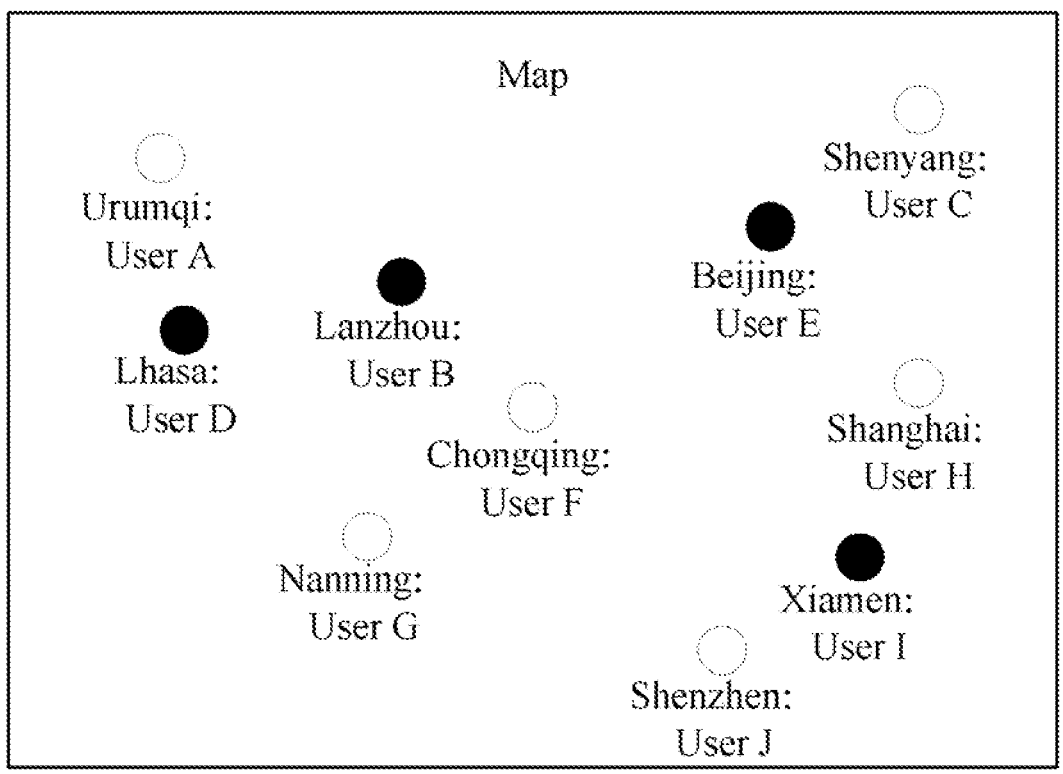
FIG. 4 and FIG. 5 are examples of an electronic map populated with the geographical information.

FIG. 3 is a flowchart of one embodiment of a method for managing geographical information of the VoIP terminal devices 3 using the VoIP server 1. Depending on the embodiment, additional steps may be added, others removed, and the ordering of the steps may be changed.

In step S10, the receiving module 100 receives the location information sent by each of the VoIP terminal devices 3. In one embodiment, the receiving module 100 receives the location information through the VoIP communication protocol. In one embodiment, the VoIP terminal device 3 has several ways of sending the location information. For example, a first way may be sending the location information when the change of the location information is out of a defined range, or a second way may be sending the location information at specific time intervals (e.g., ten minutes). The defined range includes a latitude range (e.g., one degree) and a longitude range (e.g., one degree).

In step S12, the storing module 101 creates a data sheet in the storage device 13, and stores geographical information of each of the VoIP terminal devices 3 into the data sheet. The geographical information comprises the status information and the location information. When the user of the VoIP terminal device 3 first logs into the VoIP server 1, the storing module 101 records the user information, the login information, the status information and the location information in the data sheet. When the user of the VoIP terminal device 3 has previously logged into the VoIP server 1, the storing module 101, after successfully searching for the user information of the VoIP terminal device 3 in the data sheet, adds a data row into the data sheet corresponding to the user information, and records the login information, the status information and the location information to the data row.

Once the VoIP server 1 detects a change of the status information, for example, the status information of the VoIP terminal device 3 from online going to offline, the storing module 101 searches the user information of the VoIP terminal device 3, and updates the status information recorded in the most recent data row.

In step S14, the detecting module 102 detects a query from one of the VoIP terminal devices 3. Queries may be of three types. A first type is used to obtain the geographical information of the users of the VoIP terminal devices in an appointed group (e.g., "friend" group). A second type is used to reveal the geographical information of the VoIP terminal devices which are nearby, within a default search range (e.g., radius of a certain number of kilometers). A third type is used to obtain the location information for an appointed duration related to an appointed user of the VoIP terminal device 3 (e.g., user A on one particular day).

In step S16, the populating module 103 retrieves the geographical information from the data sheet according to the detected query, and obtains an electronic map (e.g., a GOOGLE map) from the storage device 13, and populates the retrieved geographical information on the electronic map. In the embodiment, the populating module 103 marks a point on the electronic map according to a latitude and a longitude of the location information of the VoIP terminal devices 3 that are the subject of the query, and distinguishes the color of each of the points in relation to the status information.

Figure 5:
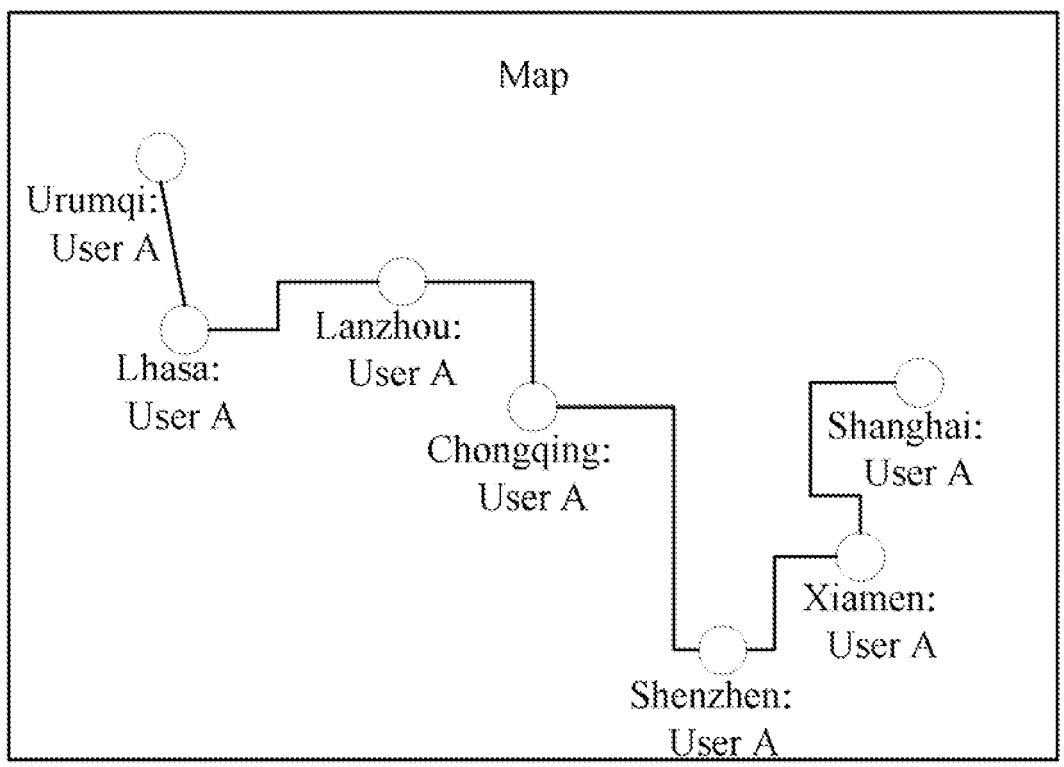

As mentioned above, the query types include the first type, the second type and the third type. The electronic map as populated according to the first type and the second type is shown as FIG. 5. In FIG. 5, the marked point "○" represents an online status of the VoIP terminal device 3, and the marked point "●" represents an offline status of the VoIP terminal device 3. The first type and the second type retrieve the data in the most recent rows for the corresponding user information of the data sheet. The electronic map as populated in response to the third type is shown in FIG. 6. The third type retrieves data only in relation to the appointed duration for the user information in the data sheet.

In step S18, the sending module 104 sends the electronic map to the VoIP terminal device 3 corresponding to the location information, and displays the electronic map of the VoIP terminal device 3 on the display device 11.

It should be emphasized that the above-described embodiments of the present disclosure, particularly, any embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure is protected by the following claims.

What is claimed is:

1. A method for managing geographical information being executed by a processor of a Voice over Internet Protocol (VoIP) server, the method comprising:
   (a) receiving location information of one or more VoIP terminal devices from the one or more VoIP devices;
   (b) storing geographical information of the one or more VoIP terminal devices into a data sheet stored in a storage device of the VoIP server, the geographical information comprising status information of each user of the one or more VoIP terminal devices and the location information of each of the one or more VoIP terminal devices;
   (c) detecting a query from one of the one or more VoIP terminal devices;
   (d) retrieving the geographical information from the data sheet according to the query, and obtaining an electronic map from the storage device;
   (e) populating the retrieved geographical information on the electronic map, comprising: marking a point on the electronic map according to a latitude and a longitude of the location information of the one or more VoIP terminal devices that are the subject of the query; and distinguishing a color of each of the points in relation to the status information of each of the one or more VoIP terminal devices; and
   (f) sending the electronic map to a VoIP terminal device corresponding to the location information.

2. The method according to claim 1, wherein the data sheet comprises user information of each user of the one or more VoIP terminal devices, login information of each user of the one or more VoIP terminal devices, the status information of each user of the one or more VoIP terminal devices, and the location information of each of the one or more VoIP terminal devices.

3. The method according to claim 1, wherein the query is selected from the group consisting of a first type for obtaining the geographical information of the users of the one or more VoIP terminal devices in an appointed group, a second type for revealing the geographical information of the users of the one or more VoIP terminal devices which are nearby within a default search range, and a third type for obtaining the location information for an appointed duration related to an appointed user of the one or more VoIP terminal devices.

4. The method according to claim 1, further comprising: displaying the electronic map of the VoIP terminal device on a display device of the VoIP server.

5. A Voice over Internet Protocol (VoIP) server, comprising:
   a storage device;
   at least one processor; and
   one or more modules that are stored in the storage device and executed by the at least one processor, the one or more modules comprising:
   a receiving module that receives location information of one or more VoIP terminal devices from the one or more VoIP devices;
   a storing module that stores geographical information of the one or more VoIP terminal devices into a data sheet stored in a storage device of the VoIP server, the geographical information comprising status information of each user of the one or more VoIP terminal devices and the location information of each of the one or more VoIP terminal devices;
   a detecting module that detects a query from one of the one or more VoIP terminal devices;
   a populating module that retrieves the geographical information from the data sheet according to the query, and obtains an electronic map from the storage device, and marks a point on the electronic map according to a latitude and a longitude of the location information of the one or more VoIP terminal devices that are the subject of the query, and distinguishes a color of each of the points in relation to the status information of each of the one or more VoIP terminal devices; and
   a sending module that sends the electronic map to a VoIP terminal device corresponding to the location information.

6. The VoIP server according to claim 5, wherein the data sheet comprises user information of each user of the one or more VoIP terminal devices, login information of each user of the one or more VoIP terminal devices, the status information of each user of the one or more VoIP terminal devices, and the location information of each of the one or more VoIP terminal devices.

7. The VoIP server according to claim 5, wherein the query is selected from the group consisting of a first type for obtaining the geographical information of the users of the one or more VoIP terminal devices in an appointed group, a second type for revealing the geographical information of the users of the one or more VoIP terminal devices which are nearby within a default search range, and a third type for obtaining the location information for an appointed duration related to an appointed user of the one or more VoIP terminal devices.

8. The VoIP server according to claim 5, wherein the sending module further displays the electronic map of the VoIP terminal device on a display device of the VoIP server.

9. A non-transitory storage medium having stored thereon instructions that, when executed by a processor of a Voice over Internet Protocol (VoIP) server, causes the VoIP server to perform a method for managing geographical information, the method comprising:
  (a) receiving location information of one or more VoIP terminal devices from the one or more VoIP devices;
  (b) storing geographical information of the one or more VoIP terminal devices into a data sheet stored in a storage device of the VoIP server, the geographical information comprising status information of each user of the one or more VoIP terminal devices and the location information of each of the one or more VoIP terminal devices;
  (c) detecting a query from one of the one or more VoIP terminal devices;
  (d) retrieving the geographical information from the data sheet according to the query, and obtaining an electronic map from the storage device;
  (e) populating the retrieved geographical information on the electronic map, comprising: marking a point on the electronic map according to a latitude and a longitude of the location information of the one or more VoIP terminal devices that are the subject of the query; and distinguishing a color of each of the points in relation to the status information of each of the one or more VoIP terminal devices; and
  (f) sending the electronic map to a VoIP terminal device corresponding to the location information.

10. The non-transitory storage medium according to claim 9, wherein the data sheet comprises user information of each user of the one or more VoIP terminal devices, login information of each user of the one or more VoIP terminal devices, the status information of each user of the one or more VoIP terminal devices, and the location information of each of the one or more VoIP terminal devices.

11. The non-transitory storage medium according to claim 9, wherein the query is selected from the group consisting of a first type for obtaining the geographical information of the users of the one or more VoIP terminal devices in an appointed group, a second type for revealing the geographical information of the users of the one or more VoIP terminal devices which are nearby within a default search range, and a third type for obtaining the location information for an appointed duration related to an appointed user of the one or more VoIP terminal devices.

12. The non-transitory storage medium according to claim 9, wherein the method further comprises:
  displaying the electronic map of the VoIP terminal device on a display device of the VoIP server.

* * * * *